(12) United States Patent
Padmanabhan

(10) Patent No.: US 6,898,518 B2
(45) Date of Patent: May 24, 2005

(54) LANDMARK-BASED LOCATION OF USERS

(75) Inventor: Venkata N. Padmanabhan, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/889,397

(22) Filed: Jul. 12, 2004

(65) Prior Publication Data

US 2004/0243303 A1 Dec. 2, 2004

Related U.S. Application Data

(63) Continuation of application No. 10/097,285, filed on Mar. 14, 2002, now Pat. No. 6,766,245.

(51) Int. Cl.[7] .................................................. H04Q 7/20
(52) U.S. Cl. ........................ 701/207; 701/200; 701/208; 348/113; 348/116; 340/988; 340/995.24
(58) Field of Search ................................ 701/200, 207, 701/208; 340/988, 995.24; 348/113, 116

(56) References Cited

U.S. PATENT DOCUMENTS

| | | | | |
|---|---|---|---|---|
| 5,884,218 A | * | 3/1999 | Nimura et al. | 701/208 |
| 5,908,465 A | * | 6/1999 | Ito et al. | 701/211 |
| 6,078,865 A | * | 6/2000 | Koyanagi | 701/211 |
| 6,084,989 A | * | 7/2000 | Eppler | 382/293 |
| 6,178,377 B1 | * | 1/2001 | Ishihara et al. | 701/200 |
| 6,263,278 B1 | | 7/2001 | Nikiel et al. | |
| 6,748,225 B1 | * | 6/2004 | Kepler | 455/456.2 |

OTHER PUBLICATIONS

Teller, et al., MIT City Scanning Project: Fully Automated Model Acquisition in Urban Areas, MIT City Scanning Project, Jan. 2002.

Padmanabhan, LandLoc: Landmark–Based Location of Users, Technical Report MSR–TR–2001–23, Jan. 2001.

Acharya, R. et al., Broadcast Disks : Data Management for Asymmetric Communications Environments, ACM SIGMOD, Jun. 1995.

(Continued)

*Primary Examiner*—Thomas G. Black
*Assistant Examiner*—Eric M. Gibson
(74) *Attorney, Agent, or Firm*—Leydig, Voit & Mayer, Ltd.

(57) ABSTRACT

Humans identify location and directions based on visual cues, such as landmarks, rather than a precise coordinate grid. A database of landmarks can be used to determine the location of a user who can merely describe their location in the same manner they would to any human contact. The location of the user can be determined based on the landmarks described in the input, and the areas from which all of those landmarks are visible. Various databases can be used, including text-based and three-dimensional. Similarly, various mechanisms can be used to determine the user's location, including hierarchical approaches, query optimization approaches, and visibility percentage approaches. Ultimately, the user's location can be determined without the need for expensive, dedicated infrastructure, without compromising the user's security, and without subjecting the user to system outages.

17 Claims, 4 Drawing Sheets

OTHER PUBLICATIONS

Bahl P. et al., RADAR: An In–Building RF–Based User Location and Tracking System, IEEE INFOCOM 2000, Mar. 2000.

Cheverst, K. et al., Experiences of Developing and Deploying a Context–Aware Tourist Guide: The GUIDE Project, ACM Mobicom, Aug. 2000.

Durand, F. et al., Conservative Visibility Preprocessing using Extended Projections, ACM SIGGRAPH, Jul. 2000.

Enge P. et al., Special Issue on GPS : The Global Positioning System, Proc of the IEEE, Jan. 1999.

Harter, A. et al., A Distributed Location System for the Active Office, IEEE Network vol. 8, No.1, Jan. 1994.

Harter A. et al., The Anatomy of a Context–Aware Application, Proc. ACM/IEEE Mobicom, Aug. 1999.

Priyantha, A. et al., The Cricket Location–Support System, ACM Mobicom, Aug. 2000.

Schaufler, G. et al., Conservative Volumetric Visibility with Occluder Fusion, ACM SIGGRAPH, Jul. 2000.

Weiser, M., Some Computer Science Issues in Ubiquitous Computing, CACM, 36(7), 1993.

http://www.bluetooth.org/.

http://www.fcc.gov/e911/.

http://city.ics.mit.edu/city.html.

http://research.microsoft.com/easyliving/.

http://www..vindigo.com/.

http://www.ust.ucla.edu/ustweb/projects.html.

* cited by examiner

LANDMARK-BASED LOCATION OF USERS

RELATED APPLICATION

This application is related to and claims priority to U.S. patent application Ser. No. 10/097,285, entitled "LANDMARK-BASED LOCATION OF USERS," filed Mar. 14, 2002, now U.S. Pat. No. 6,766,245 of which the present application is a continuation.

TECHNICAL FIELD

This invention relates generally to locating a mobile user and, more particularly, relates to locating a user through visual observations made by the user.

BACKGROUND OF THE INVENTION

An increasingly popular use of computing devices is to allow a user the ability to interact with their physical surroundings. For example, handheld computers can provide the user with information on topics of interest near the user, such as restaurants, copy centers, or automated teller machines. Similarly, laptop computers seek to allow a user to control devices located in close proximity to that laptop, such as a printer located in the same room. Additionally, specialized computing devices, such as navigational systems found in many automobiles seek to provide the user with directions based on the user's current location. A necessary element of all of these applications is the ability to determine the location of the user.

Current systems for locating a user rely on extensive, and expensive, infrastructure to support the system. One well known system for determining location is the Global Positioning System (GPS). GPS is a satellite based system in which the receiver, carried by the user, requires a signal from at least four satellites to determine the location of the user. A similar system, known as E-911, relies on signals from a user's cellular telephone to triangulate the user's position. Two methods currently relied on by the e-911 system use either the angle of the arrival of the user's signal, the time of arrival, or the time difference of arrival. Both the GPS system and the E-911 system require the installation and maintenance of expensive and dedicated infrastructure. GPS, for example, requires maintaining many satellites, and the E-911 system requires either the installation of directional antennas on the cell phone and base station, or specialized equipment at the base stations to provide time synchronization. In addition, the E-911 system may require the user to purchase a new cell phone. These systems also suffer from other drawbacks inherent in their design. For example, the GPS system does not work indoors or in locations, such as downtown areas, with significant obstructions to the signal paths between the user and the satellites and cellular telephone base stations. Similarly, the E-911 system requires that the cell phone be able to communicate with multiple base stations simultaneously.

Additional location determining systems can be used in confined areas, but they too suffer from the need to purchase and maintain dedicated infrastructure. One known system for determining the location of a user indoors is the Active Badge system, that uses infrared beacons and sensors located throughout an area to pinpoint the user's location. Additional systems rely on wireless communication between a transmitter and detectors placed throughout the indoor environment. Such systems suffer from the same complex infrastructure problem as GPS or E-911. In either case, dedicated detection equipment must be installed throughout the indoor area. Because of the amount of infrastructure needed for even small areas, such systems cannot be scaled well to larger areas, such as a whole town or metropolitan area. Additionally, some of these systems, such as infrared based systems, can be impacted by environmental concerns, such as direct sunlight.

In addition to the above problems, some of the known systems for determining a user's location suffer from privacy concerns. Specifically, the user's position is determined by infrastructure that is exclusively controlled by a central authority. Thus, the central authority could use the system to determine the location of a user even when that user did not wish to learn their location, or did not wish to be located. Furthermore, because all of these systems rely on a central architecture, they all leave the user vulnerable to system outages when the infrastructure required is not properly operated or maintained by the central authority. Often, the user is simply forced to rely on human interaction to determine their location.

SUMMARY OF THE INVENTION

Accordingly, the present invention is directed to identifying the location of a user without relying on dedicated infrastructure and a central authority.

Additionally, the present invention is dedicated to identifying the location of a user based on landmarks or other visual cues visible to the user from their current position.

The present invention is likewise directed to providing a user with an accessible and efficient database of landmarks and other visual cues from which the user's position can be determined.

For centuries, people have guided one another by landmarks and visual cues. For example, people will often identify intersections, not by the street names, but by the names of gas stations or stores located on that corner. Similarly, people often describe their position as relative to specific landmarks, rather than using a more accurate coordinate system. The present invention seeks to capitalize on this interaction to provide a more intuitive system for determining the location of a user, that does not require significant infrastructure, comprise the user's privacy, or leave the user vulnerable to system-wide outages.

The present invention contemplates a database of landmarks in a given area, such as a metropolis or a shopping mall. The database can be textual, associating landmarks with descriptive terms commonly used to describe that landmark. Alternatively, or in addition, a three-dimensional topographical database of the environment can be used, which can provide information regarding the visibility of the landmark from various locations, as well as distinctive features that can be used to further specify the user's location.

Because of the nature of location determination, the present invention anticipates a portable computing device to interface with the database and calculate the user's position. While a textual database can be of a sufficiently small size to be wholly stored on the portable computing device, a three-dimensional topographical database may contain too much information to be stored, in its entirety, on the portable computing device. Various techniques can be used to reduce the size of the database to more easily accommodate the generally smaller storage capacities of storage devices used by portable computing devices. For example, the three-dimensional topographical database can be simplified by removing information the user is not likely to comment upon, such as the texture of a wall of the building, or the windows of the building. Instead, the model can be downgraded such that it consists merely of block shapes that provide a minimum of information while continuing to allow the computation of the visibility regions. Alternatively, a subsection of the three-dimensional topographical model can be downloaded to the portable computing device, and the remainder can be obtained from a server that has increased storage capacity and can store the whole model. The portable computing device can request specific information from the server, or it can merely listen to broadcast or multicast transmissions from the server providing additional information for a specific area or region. Similarly, a minimalist model, containing only the block shapes, can be used in conjunction with server communication, such that the server can be contacted to provide the features and elements, as needed, that were removed from the minimalist model.

With a portable computing device having access to a database of landmark information, the user can provide input that will enable the system to determine the user's location. The portable computing device can be equipped with a pen-based or keyboard-based input device to accept computer-readable information from the user, or the device can be equipped with a microphone and speech interpreting software to accept vocal input. Using the appropriate input device, the user can describe, in varying degrees of specificity, what the user sees. Based on the description of the landmarks provided by the user, the portable computing device can access the database to determine the user's location. If insufficient information was provided, or the information results in the determination of more than one unique location, the user can be prompted for more information. For example, the user can be prompted for specific information needed to resolve an ambiguity, or the user can be prompted for more information, generally, about their surroundings.

Once the portable computing device has been provided with the user's input, it can compare the user's descriptions of their surroundings to the database to identify the landmarks that the user is describing. Visibility regions, indicating those areas from which the landmark can be seen, can be calculated for each landmark identified, or for a more focused subset, such as those landmarks that have small visibility regions. If the intersection of the visibility regions yields only one location, then the system can return it as the user's location. Alternatively, if the intersection of the visibility regions yields an area, or multiple areas with differing probabilities of likelihood, the system can prompt the user for more information. The user's location can, therefore, be located by determining a location which uniquely matches the description provided by the user of their current surroundings.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF A PREFERRED EMBODIMENT

Figure 1:
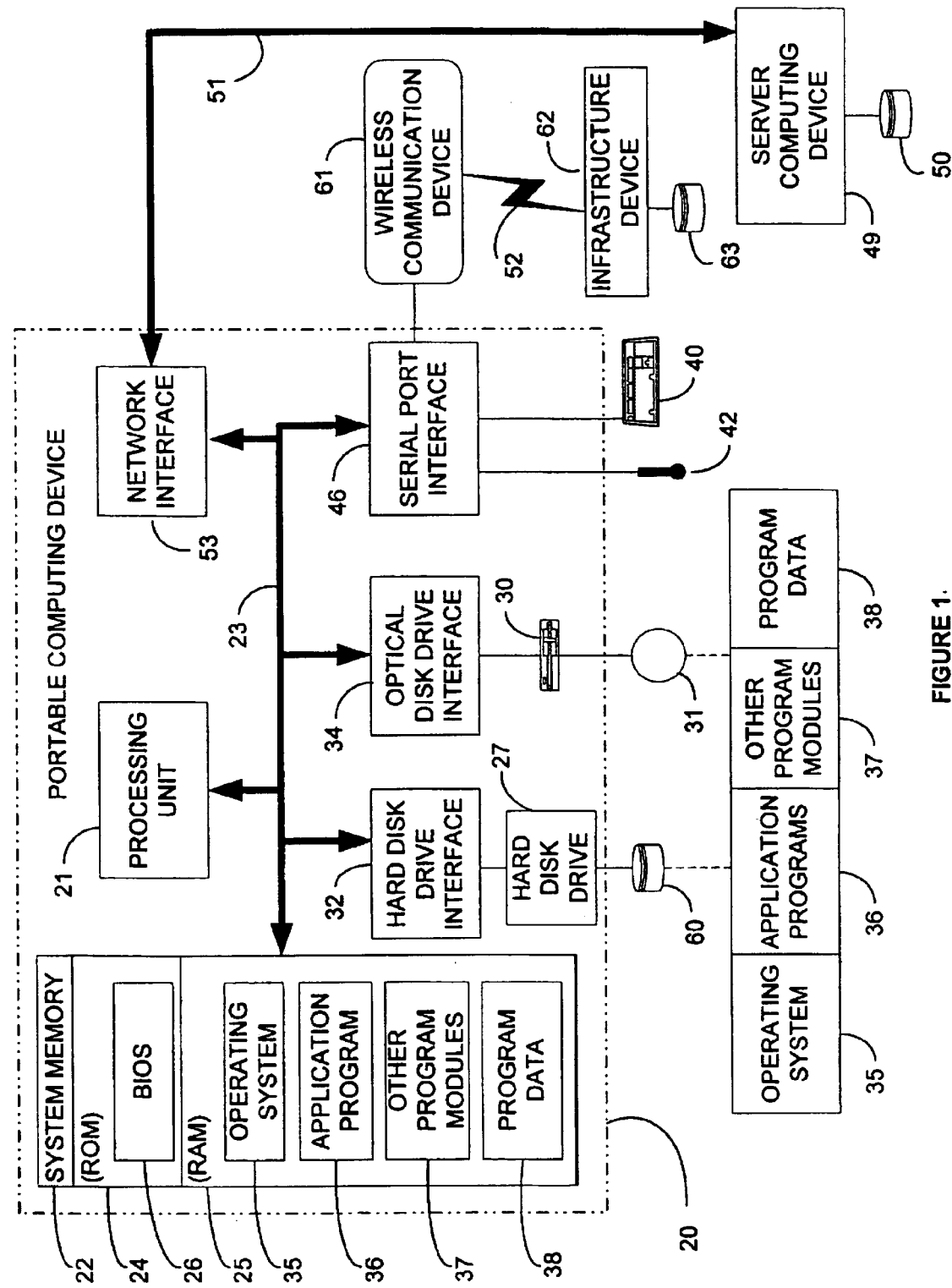
FIG. 1 is a block diagram generally illustrating an exemplary computer system on which the present invention resides.

The present invention contemplates the determination of the location of a user based on the user's description of their surroundings. A portable computing device can be used to accept user input and determine the user's location, or communicate with additional computing devices to determine the user's location. A database of landmarks, and other visual cues, can be accessed to identify the landmarks described by the user. The database can further be used to determine the user's location by identifying a unique location that matches the user provided description of the user's view.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computing device. Generally, program modules include routines, programs, objects, components, data structures and the like that perform particular tasks or implement particular abstract data types.

The invention may be implemented in a variety of computer system configurations, including stand-alone configurations, client-server configurations, and client-infrastructure configurations. For example, the invention may be realized in portable computing devices, such as hand-held devices, laptop computers, pocket computers, wearable computers, dedicated electronic devices, or programmable consumer devices. Alternatively, the invention may be realized in a client-server configuration, including a client computing device, such as a personal computer, a micro-processor based specific computing device, or a portable computing device, as described above, and a server computing device, such as a personal computer, a server computer, multi-processor computer system, a minicomputer, or a mainframe computer. Furthermore, the invention may also be realized in a client-infrastructure configuration, including a client computing device such as those described above, and infrastructure computing devices, such as dedicated broadcast equipment, kiosks, network access points, or base stations. The invention may be practiced in distributed computing environments, such as the client-server environment and the client-infrastructure environment, described above, where tasks are performed by remote processing devices that are linked through a communications network. In a distributed computing environment, program modules may be located in both local and remote memory storage devices.

Although the invention may be incorporated into many types of computing environments as suggested above, the following detailed description of the invention is set forth in the context of an exemplary general-purpose portable computing device 20.

Before describing the invention in detail, the computing environment in which the invention operates is described in connection with FIG. 1.

The portable computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the portable computing device 20, such as during start-up, is stored in ROM 24.

The portable computing device 20 can also include memory storage devices, such as a hard disk drive 27 for reading from and writing to a hard disk 60, or an optical disk drive 30 for reading from or writing to a removable optical disk 31. Alternatively either the hard disk drive 27, and corresponding hard disk 60, or the optical disk drive 30 and corresponding optical disk 31 may be replaced with solid state memory storage devices, including a solid state memory storage drive and memory cards, such as a Compact Flash (CF) memory card, a MultiMedia Card (MMC), or a SmartMedia (SM) card. The hard disk drive 27 and optical disk drive 30 are connected to the system bus 23 by a hard disk drive interface 32 and an optical disk drive interface 34, respectively. Similarly, a solid state memory storage drive interface could be used to connect the solid state memory storage drive to the system bus 23. The memory storage devices provide nonvolatile storage of computer readable instructions, data structures, program modules and other data for the portable computing device 20. It will be appreciated by those skilled in the art that, while some types of computer readable media are particularly called out in the description of a preferred embodiment, other types of computer readable media which can store data that is accessible by a computer, such as magnetic cassettes, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the portable computing device 20 through input devices such as a keyboard 40 and a microphone 42. Other input devices (not shown) may include a mouse, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). The portable computing device 20 can also contain a visual output device, such as a Liquid Crystal Display (LCD) or other portable display technology, or an audio output device, such as a speaker or headphones.

The portable computing device 20 may operate in a networked environment using logical connections to one or more remote computers, such as a server computing device 49. The server computing device 49 may be a server computer, a router, a minicomputer, a microcomputer, a multi-processor computing device, a network PC, a peer device or other common network node, and typically includes many or all of the elements described above relative to the portable computing device 20, although only a memory storage device 50 has been illustrated in FIG. 1. Alternatively, or in addition, the portable computing device 20 can also utilize an infrastructure device 62, specifically designed to assist the portable computing device in determining the location of the user. For example, infrastructure device 62 can be a kiosk that can download a database containing information about landmarks in the vicinity of the kiosk. Alternatively, the infrastructure device 62 can be a wireless network access point, or another portable computing device that can uniquely identify its position to the portable computing device 20. The infrastructure device 63 is shown with an attached memory storage device 63, though the infrastructure device 62 can access the memory storage device 63 through a variety of connections in addition to the direct connection shown, such as a wireless connection, or a network connection.

The logical connections depicted in FIG. 1 include a local area network (LAN) 51 and a wireless network 52. Such networking environments are commonplace in offices, enterprise-wide computer networks, intranets and the Internet. Additionally, such networking environments can rely on various protocols including Ethernet protocols, wireless Ethernet protocols, Infra-Red Data Association (IrDA) protocols, Bluetooth protocols, and the like. When used in a LAN networking environment, the portable computing device 20 is connected to the local network 51 through a communication device such as a network interface or adapter 53. When used in a wireless networking environment, the portable computing device 20 typically includes other communication devices, such as a wireless communication device 61, connected to the system bus 23 via the serial port interface 46. In a networked environment, program modules depicted relative to the portable computing device 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In accordance with one aspect of the invention, a database containing information about landmarks and visual cues is provided to determine a user's location based on landmark identification input provided by the user. The database can be a simple textual database correlating landmarks and descriptive terms commonly used to describe the landmark. Alternatively, or in addition, a three-dimensional topographical database can provide further information, including visibility regions, and noticeable physical traits. To minimize the burden on the user, the present invention contemplates the use of a portable computing device to identify the user's location. The three-dimensional topographical database, together with additional smaller databases, such as the simple textual database, can be stored on the portable computing device by removing some information from the three-dimensional topographical database, or providing only a portion of the topographical database, with the remainder to be downloaded as needed.

In accordance with another aspect of the invention, the user's location can be identified by reference to input received from the user describing nearby landmarks and other visual cues. Based on the user's input, the portable computing device can reference the database stored therein, or can reference an external database, and can determine the landmarks described by the user. Based on the locations of the landmarks, and their visibility regions, the portable computing device can determine the user's location. If the determined landmarks are visible from more than a single location, or the probability that the user is in a particular location remains too low, the user can be prompted for additional information, such as more specific information about landmarks the user has already described, or information about an additional landmark. This additional information can then be used to identify the location of the user.

In accordance with yet another aspect of the invention, the portable computing device can rely on additional databases or information contained on a remote server computing device, or on an infrastructure device located near the user. Thus, the portable computing device can reference the server computing device for additional database information which is not stored locally, or to perform computationally intensive processes, such as calculating a visibility region. The portable computing device can also reference infrastructure devices to download a more localized database, to learn the location of the infrastructure device with which it is communicating, or to learn the location last determined by similar portable computing devices located within the user's vicinity.

Figure 2:
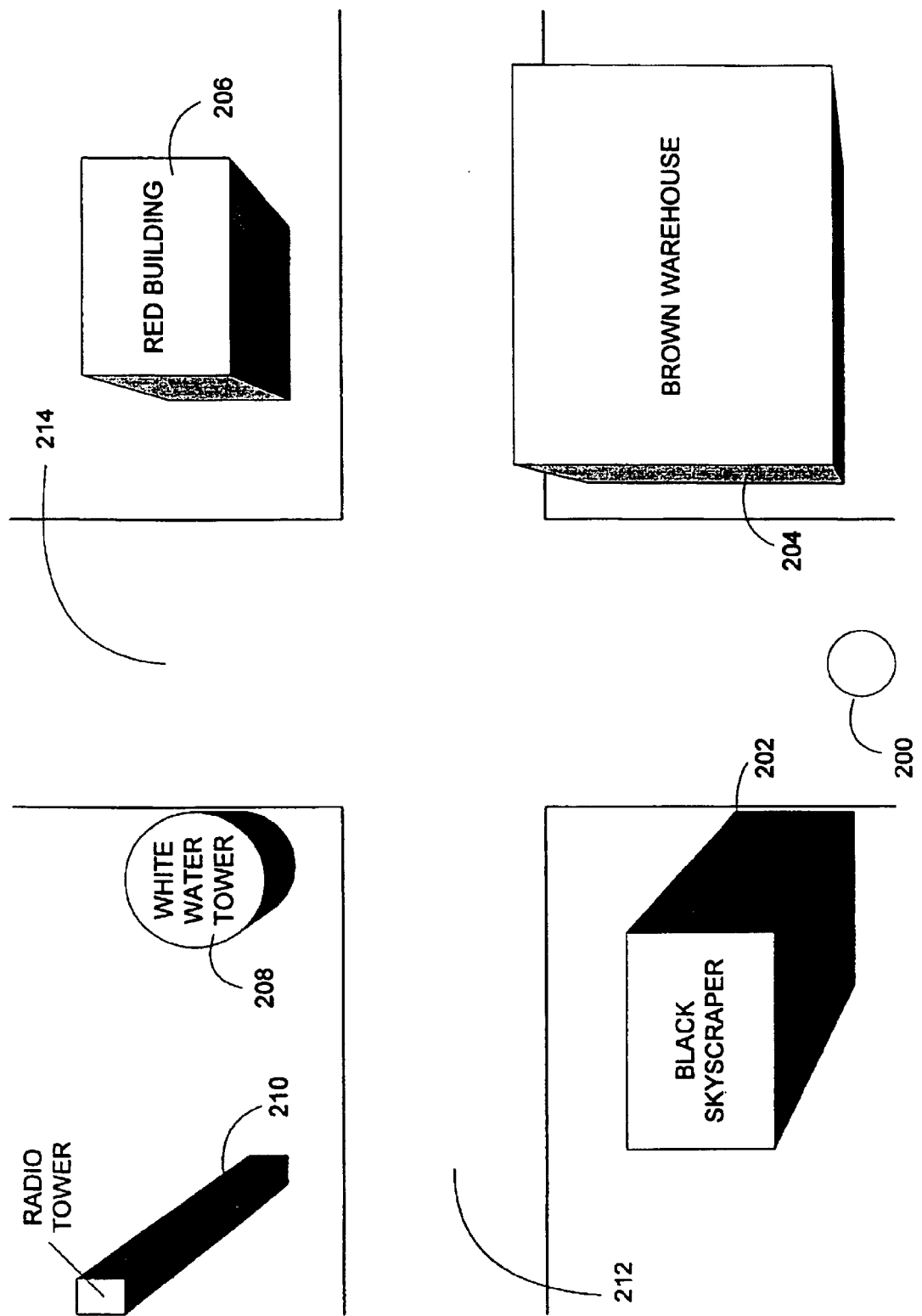
FIG. 2 is a three-dimensional representation of an exemplary area in which the present invention can be used.

In keeping with the invention, a database is referenced by a portable computing device to determine a user's location based upon the user's input describing the visual scene around them. Turning to FIG. 2, an exemplary environment is shown, with a user 200 and various landmarks, including buildings 202, 204, and 206, a water tower 208, and a radio tower 210. As an initial matter the exemplary environment shown in FIG. 2 will be used to describe databases contemplated by the present invention. In addition, the exemplary environment shown in FIG. 2 will also be used to illustrate the determination of the location of the user. As will be understood by those skilled in the art, the two steps of acquiring the database and using the database take place at different times and are not required to be done consecutively.

One database contemplated by the present invention is a simple textual database correlating landmarks to common descriptive terms a user might use to describe them. For example, building 202 is shown as a black skyscraper. The user is likely to comment on the color of the building, and might refer to it as "black", or "dark", or perhaps "tinted". Similarly, the user is likely to comment on the building's height, and might call it "tall", "big", "large", or a "skyscraper". In addition, there may be other features of the building that the user might notice, such as "red antennas" or "white columns". Each of these descriptions can be entered into a database together with the location of the building 202. Such a location can be identified using a localized Cartesian grid, the position in latitude and longitude, such as that provided by a GPS receiver, the building's relationship to the nearest intersection, or any other location identifying format. A similar process can be performed on the other buildings 204 and 206, and on the water tower 208 and the radio tower 210. Table 1 below illustrates an exemplary simple textual database correlating the buildings, their location, and descriptive terms which would be commonly used to describe the corresponding building.

TABLE 1

| Building ID | Location | Height Description | Size Description | Color Description | Other Features |
|---|---|---|---|---|---|
| 202 | 150, 150 | tall | large big | black dark tinted | red antennas white columns |
| 204 | 450, 150 | short | large big | brown tan | |
| 206 | 450, 450 | medium normal average | medium normal average | red brick pink | 1500 sign |
| 208 | 150, 450 | tall | tall medium normal average | white beige light | name METROPOLIS |
| 210 | 50, 450 | tall | tall thin | red white striped | blinking red light |

For purposes of illustration, Table 1 contains a column for the "Building ID" which, in the present example, references the number provided in FIG. 2. However, the building ID can be any identifier that can be used to refer to the building across varying databases, if necessary, such as when calculating a visibility of the building, or when determining the location of the user. Similarly, while Table 1 only contains columns for "Height Description", "Size Description", and "Color Description", any number of descriptive divisions can be made in the database, or, as another alternative, each of the terms can be stored individually, rather than grouped by the property they describe.

The exemplary database of Table 1, above, also provides a mechanism to store additional descriptive features of a building, such as a prominent address, name, or other visually unique feature. For example, the red building 206 of FIG. 2 can contain a large address number of 1500 displayed prominently on its facade. While the user may not know what street they are on, and thus derive no locational information from the sign, the portable computing device 20 can use the existence of the sign as a mechanism by which to uniquely identify the building based on the user's input. Similarly, the radio tower 210 can have a blinking red light that may be described by a user and can, therefore, be stored in the table.

Additional information to that described above can be added to the textual database, or stored in an alternative database, and referenced by the portable computing device when attempting to determine the user's location. Alternatively, the information contained in the textual database above can be stored as additional data, or as meta-data, within another database, such as the three-dimensional topographical database which will be described in detail below. As will be appreciated by those of skill in the art, the textual database above can determine the user's location to a rough approximation. By taking into consideration where the landmarks described by the user are visible from, the location of the user can be determined with greater precision.

A three-dimensional topographical database can model the three dimensional properties of an area, providing the data from which visibility regions can be determined. Such a three-dimensional topographical database can be generated using a variety of techniques, including automated data gathering techniques, and techniques involving manual input. As an initial step, images of the region can be taken, either manually or through an automated process. Generally, overlapping images providing a complete view around the point at which the images are being taken can provide an optimal input from which to construct the three-dimensional topographical database. Such images can also be generated from fish-eye lenses that can capture a surrounding panorama in a single photo. Alternatively, the photographs need not overlap, but can provide a minimum of information necessary to view all of the sides of the object to be added to the database.

Together with the images, the location of the camera can be provided to aid in the generation of the three-dimensional topographical database and to provide information regarding the angles and distances contained in the images. Based on the location of the camera, and the information within the images, a mosaic can be constructed to provide a more complete view. Such a mosaic can be simply the view around a given point, or it can be a three dimensional view of an object from two dimensional images taken from various angles.

Once the image data has been entered, known algorithms can scan the images and extrapolate from them the outlines of objects contained within the image. Again, such a process can be automated, or it can rely on human guidance. One method for inferring structure from the data contained in the images is to use a feature-based algorithm. A feature-based algorithm infers structure from the proximity of features, such as corners or edges. An alternative algorithm is a region-based algorithm that attempts to infer structure by identifying a large section of an image that appears to be a surface, such as a wall of building. Yet another alternative algorithm is known as "edge histogramming" and it seeks to identify a vertical facade by assuming that such a facade would have many horizontal edges. Each of these algorithms can also be guided by human input, such as to identify particular walls that may be difficult for the algorithms to identify, or to guide the algorithms to a particular section of the image, or a particular shade of color to aid in the identification of the building structures. As will be appreciated by those skilled in the art, the above algorithms are merely exemplary, as the present invention does not rely on a particular method for obtaining the three-dimensional topographical database.

Some of the above algorithms yield only geometric information, without color or texture, while others provide geometry with color and texture. In order to determine visibility regions, the color and texture of a building are not of prime importance and can be sacrificed to maintain a manageable size for the three-dimensional topographical database. Furthermore, color and texture information, to the extent that they would be noticed by a user and input into the system, could be contained more efficiently in the simple text-based database described above.

Figure 3:
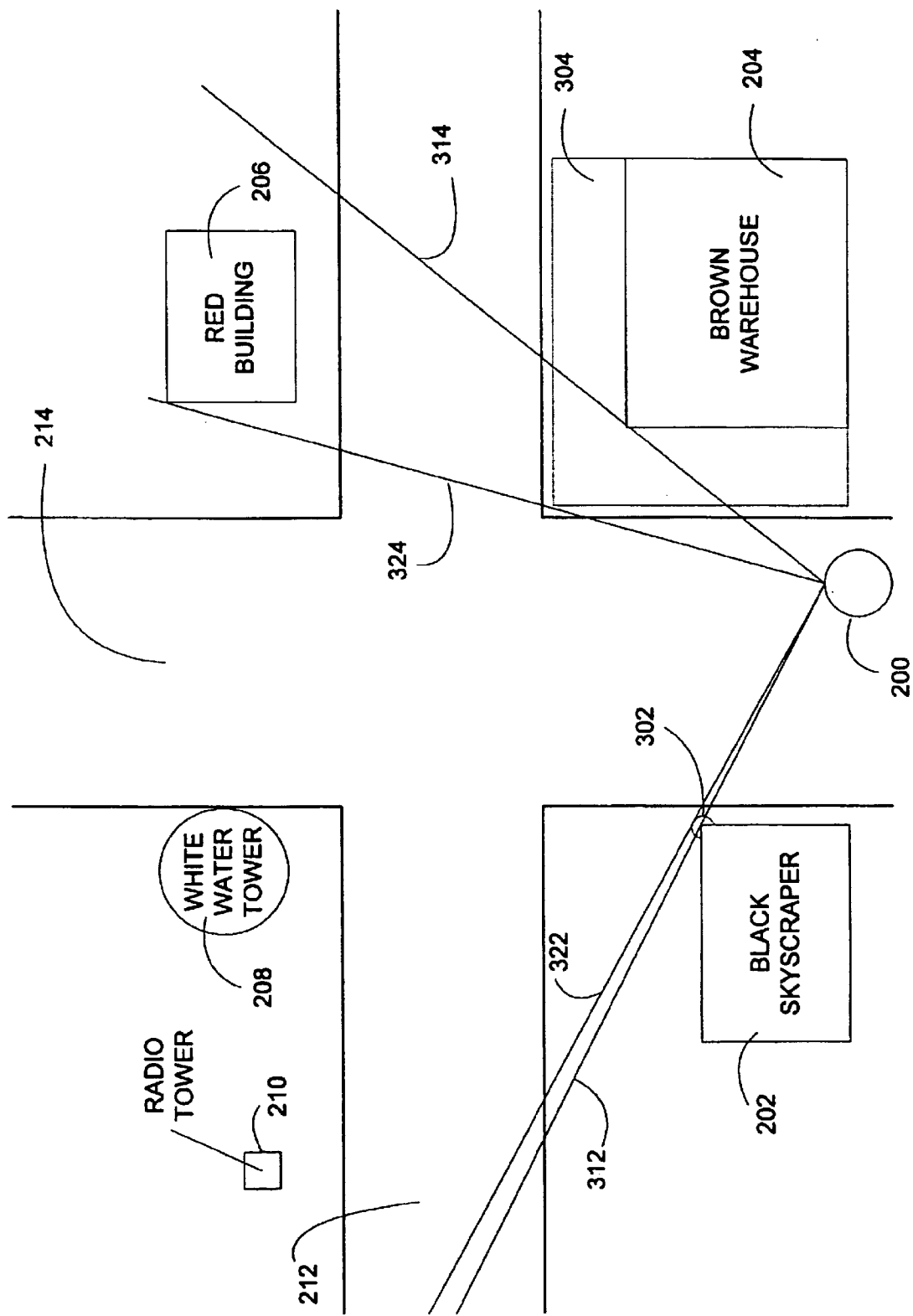
FIG. 3 is a two-dimensional representation of an exemplary area in which the present invention can be used.

Because the geometry that is obtained by the algorithms described above can contain details that may not be required to determine a visibility region, such details can be omitted for additional storage and processing savings. For example, the geometry derived by the above algorithms can contain details such as ledges, engravings, small antennas and other similar protrusions from the building that do not significantly impact the visibility calculations. Turning to FIG. 3, the environment of FIG. 2 is shown in a strict two dimensional perspective. The skyscraper 202 is shown with a small antenna 302 protruding from a corner of the skyscraper. The antenna 302 may be included in a geometric model derived from images of the skyscraper 202, but is not likely to be a significant factor in calculating visibility regions. For example, as can be seen from FIG. 3, a user's line of sight 322 is not very different from an estimated line of sight 312 which does not take into account the antenna 302. Using either the line of sight 322 or 312, the same buildings and landmarks are going to be visible to the user 200.

Consequently, such antennas and other small protrusions need not be retained in the three-dimensional topographical database. By ignoring the protrusions, each building can be modeled by as few as four polygons depicting the four sides of the building. Such a simplification can allow a large metropolitan area with as many as 1 million buildings to be modeled in a three-dimensional topographical database containing as few as 4 million polygons—a manageable amount even with average portable hardware.

However, some protrusions and other geometric features may be noticed by the user and even though they do not materially affect visibility calculations, may need to be retained in some form. Such information can be retained as an entry in the textual database, for example in the same manner as described above with respect to noticeable features, or such information can be added as additional data in the three-dimensional topographical database, or in another database. For example, if a building has gargoyles along its top, it is not likely that such carvings will materially affect visibility, and the building can be modeled as a simple structure with polygonal walls. However, the user may notice the gargoyles and describe the building as "having gargoyles on top". Such input can be particularly useful, as will be seen in more detail below, because the number of buildings having such a feature is likely to be small, providing a much smaller list of candidate landmarks being described by the user. Thus, information about such unique geometric features can be retained to allow the portable computing device the ability to narrow its search of landmarks matching the user's input if the user describes such features.

An additional consideration when modeling a building as having simple polygonal walls is the affect on visibility calculations by reducing the building's geometry to a few simple polygons. If the resultant inaccuracies cause the visibility calculations to determine that a given landmark is visible when it is, in fact, not visible, the accuracy of the location of the user is not likely to be affected. Returning to FIG. 3, the warehouse 204 contains a loading dock awning 304 that may affect visibility calculations. In attempting to model the warehouse 204 as a four polygons, and thereby removing the geometric information of the awning, the polygons that will represent the walls can be placed either at the boundaries depicted by the warehouse 204 or by the warehouse 204 together with the awning 304. If the warehouse 204 is modeled as four polygons placed at the edges of the warehouse 204, the user 200 will be determined to have a line of sight 314. However, if the warehouse 204 is modeled as four polygons placed at the edges of the warehouse 204 with the awning 304, then the user 200 will be determined to have a line of sight 324.

If the warehouse 204 is modeled in such a manner that the user's line of sight is determined to be 314, then visibility calculations will conclude that the red building 206 is visible to the user. However, the red building 206 may, in fact, not be visible to the user because the user's actual line of sight is line 324. In such a situation, the determination of the user's location is not likely to be affected because the user cannot see building 206 and will, therefore, not describe it in the input provided to the portable computing device 20. Because the user's location is based on landmarks that are described by the user as input into the portable computing device, the mere fact that the user does not describe building 206 should not affect the determination of the user's location.

However, it should be noted that the converse of the above scenario may cause difficulty in determining the location of the user. If a simplified geometric representation of a building results in visibility calculations indicating that a given landmark is not visible from a particular location when the landmark is, in fact, visible, the location of the user may be determined incorrectly. For example, in FIG. 3, if the warehouse was modeled geometrically as four polygons placed at the edge of the awning 304 and the warehouse 204, the user 200 would be determined to have a line of sight 324. With a line of sight 324, the user 200, at the location shown in FIG. 3, would not be able to see building 206. However, if the user 200 can, in fact, see building 206 because the awning 304 does not actually block the view, the user may describe building 206 as input into the portable computing device. The user's location may, then, be improperly determined because only areas from which building 206 is visible will be considered as potential locations of the user. The user's actual location, as shown in FIG. 3, will not be among these potential locations, because it will be determined, due to the geometric modeling, that building 206 is not visible from that location.

To the extent that modeling buildings as polygons removes geometric details that do not significantly affect visibility, one preferred embodiment locates the polygons at the locations of the walls or other dominant vertical surfaces. Another preferred embodiment locates the polygons a given percentage towards the center of the building from wherever a wall of the building is determined to be located. For example, as described above, geometric information can be extracted from images of a building or a scene. Such extracted geometric information can contain significant details, such as ledges, antennas, or the like, that can obscure the wall of a building. While known algorithms exist for extrapolating the locations of major elements of a scene, such a wall, from details contained therein, such algorithms may not be perfectly accurate. Because, as shown above, modeling a building as a smaller structure than it actually is does not significantly affect the determined location of the user, one preferred embodiment locates the polygons modeling the building a certain percentage, such as 10%, closer to the center of the building than the determined location of the building walls. In such a manner, the modeled buildings will usually be smaller that the actual buildings and the calculations of the location of the user can remain accurate despite inaccuracies in the algorithms designed to extrapolate the location of building walls, and other major elements, from geometric information containing many additional geometric details.

As described in detail above, the memory storage required for the three-dimensional topographical database can be reduced by modeling the buildings and other landmarks as geometric shapes represented by polygonal sides. Another manner in which the memory storage requirements of the three-dimensional topographical database can be reduced is to divide it into subsections, such as a city area, a particular region, or the like. The subsections can be individually provided to the portable computing device 20, as needed, such that only a fraction of the whole three-dimensional topographical database need be stored locally at any time. Various methods can be used to deliver the sections of the three-dimensional topographical database to the portable computing device 20 as needed by the user, including various client-server connections and reliance upon infrastructure.

One preferred embodiment for providing sections of the three-dimensional topographical database to the portable computing device 20 is to enable a client-server link between the portable device 20 and a three-dimensional topographical database server such as server computing device 49. The present invention contemplates various wireless connections to the three-dimensional topographical database server. For example, in a relatively small environment, such as the inside of a mall or office building, the portable computing device can remain in continuous communication with a server through a wireless Ethernet protocol. Alternatively, in larger environments, such as a city or downtown area, the portable computing device 20 can wirelessly connect to the server computing device 49 through common cellular telephone and cellular data packet protocols. As will be seen by those skilled in the art, the present invention does not require the use of a particular protocol or connection, though a faster connection can increase the efficiency of the communication, and may improve the user's experience.

Due to the significant amounts of memory storage that the three-dimensional topographical database can require, and because wireless communication generally does not have a high throughput, it may be advantageous to transmit smaller sections of the topographical database more often, rather than to provide the user with larger segments that require a noticeable, or unacceptable, time to download. Additionally, the portable computing device is likely to have memory storage so that additional sections, not currently used by the user, can remain in memory, decreasing the need to communicate with the server. For example, the portable computing device 20 can have, pre-installed, a significant portion of the overall three-dimensional topographical database, or those segments of the three-dimensional topographical database most commonly used. In such a case, the portable computing device 20 would only need to communicate with the server and obtain additional segments if the user traveled beyond the area modeled by the topographical database installed on the portable computing device.

The simple text-based database described above can be used to determine which segments of the three-dimensional topographical database should be requested from the server computing device 49. The user can provide input to the portable computing device describing various landmarks visible from the user's present location. Based on the text-based database, the user's location can be approximated. If the portable computing device does not already have this segment of the three-dimensional topographical database resident locally, it can request it from the server computing device 49. Alternatively, the portable computing device can track the movements of the user, and determine the appropriate segment to request from the server computing device based on the direction of travel of the user. The portable computing device can also have installed thereon additional location sensors, such as a GPS receiver, and can track the user's movements based on the location as provided by the GPS receiver, when available, and based on previously determined locations using the landmark identification of the present invention. In addition to requesting segments of the three-dimensional topographical database as needed, the portable computing device can request them in advance and buffer them until needed. One method for efficiently requesting the segments in advance is to estimate the direction of the user's travel, as described above, and extrapolate the direction beyond the next segment. In such a manner, if the user continues in their present course, the next segment will already be buffered on the portable computing device 20. Using such a system it is possible to continually buffer new segments before they are needed to determine the user's location, resulting in more responsive location determination.

Another preferred embodiment of the present invention avoids the need to maintain or initiate a client-server link by transferring additional segments of the three-dimensional topographical database to the portable computing device 20 through infrastructure devices such as infrastructure device 62. One such infrastructure device can be a kiosk at which the user can aim the portable computing device 20 and receive a segment of the three-dimensional topographical database through an infrared or radio frequency wireless connection. Because kiosks can be placed in known locations, the segment of the three-dimensional topographical database that is provided by the kiosk can be the segment of the area surrounding the kiosk. An alternative infrastructure device can be a base station that broadcasts a segment of the three-dimensional topographical database. Again, because the base station can be placed in a known location, and the broadcast range can be limited compared to the coverage of the segments of the topographical database, the base station can broadcast only the segment of the topographical database covering the vicinity of the base station.

By using infrastructure device 62 broadcasting a given segment of the three-dimensional topographical database, the portable computing device 20 does not need to request a particular segment. Additionally, because these infrastructure devices may have a small broadcast range, their location can simultaneously be the location of the user when the portable computing device 20 is close enough to receive the communication from the infrastructure device 63. The portable computing device 20 can then pass the location provided by the infrastructure device 63 onto the user, or can use it as a starting point from which to determine the location of the user as the user moves beyond the range of the infrastructure device.

Figure 4:
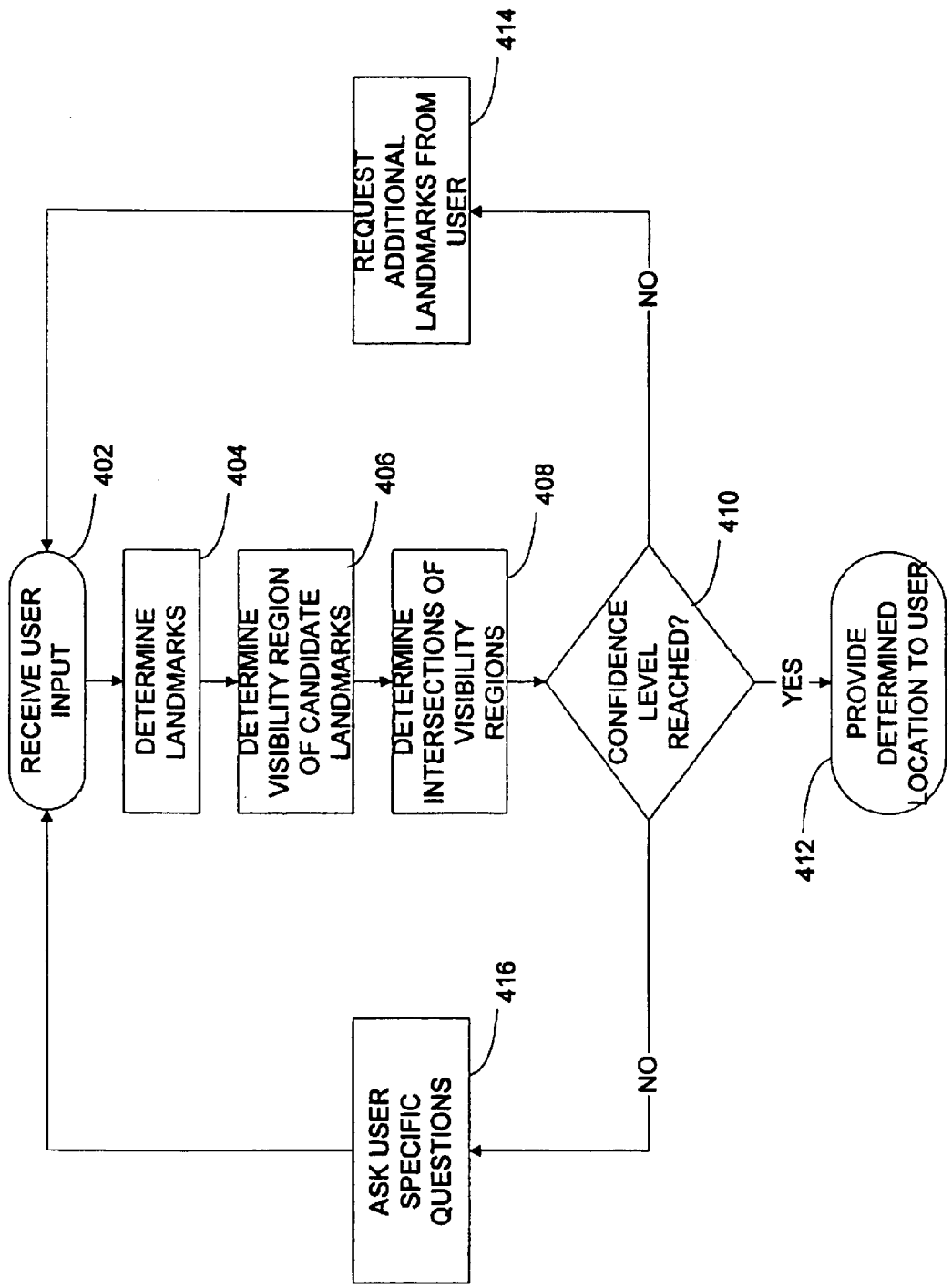
FIG. 4 is a flowchart illustrating one preferred embodiment of the present invention.

Turning to FIG. 4, a flowchart is shown illustrating one preferred method for using the portable computing device described above to determine the user's location. Initially, at step 402, the portable computing device receives a user input describing landmarks and other visual references visible to the user at the user's present location. As described above the portable computing device 20 can include various input devices, such as a keyboard 40 or a microphone 42. Because the portable computing device is likely to be carried by the user, and likely to be quite small so as not to unduly burden the user, one preferred embodiment relies on speech input through the microphone 42 to receive the user's input. Alternatively, larger portable computing devices can use keyboard, mouse, or various other input devices to receive the user's input. As is known by those of skill in the art, numerous speech recognition techniques are available for obtaining computer-readable input from a user's vocal input. The present invention is not limited to the use of any particular technique for interpreting vocal input, though it is important to note that complex algorithms may not be necessary because it is likely that the user's input will contain a limited vocabulary and not be continuous speech. Thus, the vocal interpretation algorithms selected can remain efficient because the user is likely to use only descriptive terms and architectural nouns in communicating the landmarks currently visible to the user. Similarly, the vocal interpretation algorithms selected need not be concerned with interpreting continuous, conversational speech, as the user is likely to use short, staccato phrases and terms to describe the currently visible landmarks.

The user input of step 402 can be a description of a single landmark, or of all the landmarks visible to the user at the present location. If the user does not provide sufficient information at step 402, the portable computing device 20 can request additional information at step 414 or 416, as will be described further below. Returning to the user input at step 402, it is expected that the user will provide sufficient information to enable the portable computing device 20 to determine the user's position. Such input can include specific characteristics of the landmarks visible to the user. For example, the user can identify the color of a landmark, its approximate height, its size, and any other distinguishing features, such as signs, colors, lights, carvings, or other distinctive visual features. In general, it is more helpful if the user provides specific descriptions as it allows the portable computing device 20 to more quickly and more accurately determine the landmark the user is describing. For determining the user's location, it is also helpful if the user provides the relative location of the landmark the user is describing, such as whether it is in front or behind the user, or whether it is to the user's left or to the right. Such information can be used further aid in the determination of the user's input, such as determining whether the user is between two landmarks.

To ensure appropriate user input, the portable computing device 20 can interact with the user through either visual output, such as through a screen or other display, or through audio output, such as through a speaker or earphones. If portability is of primary concern, audio interaction may be preferred because the size of the portable computing device 20 can be significantly reduced if it does not need any display capabilities. Using the feedback to the user, the portable computing device can request or guide the user's input. For example, the portable computing device can request that the user identify specific characteristics of the landmarks the user sees. The portable computing device 20 can also guide the user to help the user select the landmarks to describe. For example, the portable computing device can request that the user describe landmarks close to the user, rather than larger landmarks that are further away. As will be understood by those skilled in the art, a large landmark has a large visibility radius and does not aid determining the user's location. Additionally, the user can be directed to provide partial input regarding landmarks, even if the user does not have more complete information. As will be explained further below, the user's location is based on as many inputs as the user can provide, and a landmark need not be identified completely. Thus, if the user sees a red building, but cannot determine its size, the mere fact that the user is near a red building can aid the portable computing device 20 in determining the location of the user. However, many users may not understand this and, thus, withhold partial information because they cannot provide more complete information. The feedback from the portable computing device can guide the user and request this input.

Another alternative contemplated by the present invention is for a video or image capture device to provide an image as a component of the user's input at step 402. The image could be compared to a series of stored images, or it could be used in a manner similar to that described above and have information regarding the user's surroundings automatically extracted from it through feature recognition algorithms.

The image capture device can be part of the portable computing device 20, or a separate attachment connected through common communication protocols, such as USB or Firewire. Additionally, the image capture device can automatically capture images or can do so under the control of the user. For example, the portable computing device 20 could automatically activate the image capture device, or request that the user capture the image of a particular structure, to obtain further information if the user's input was not sufficiently descriptive.

Returning to FIG. 4, at step 404, the portable computing device 20 can determine the landmarks that the user has identified as being visible from the user's current location. In a preferred embodiment, all of the user's input need not be matched to a specific landmark available in the databases, but need only be matched to a list of candidate landmarks. Thus, if the only input provided by a user was the identification of a building as red, the list of candidate landmarks can contain all of the red buildings in the databases. Such a list of candidate landmarks can be created for all of the inputs provided by the user.

The list of candidate landmarks can then be further trimmed by considering the visibility region of each landmark, at step 406. As will be recognized by those of skill in the art, the determination of the visibility region of a landmark can be a computationally intensive process. As will also be recognized by those of skill in the art, many algorithms exist for such computation and the present invention is not intended to be limited to any particular algorithm, although more efficient algorithms are likely to be more suitable for the computing abilities of a common portable computing device, and are likely to result in a more satisfactory user experience.

Generally, the calculation of a visibility region comprises calculating a line between a visibility point in space and a point on the building and then determining whether that line intersects any other objects. If the line crosses any other objects, then the selected point of the building is not visible from the visibility point in space. Optimizations can be achieved by limiting the points selected on the building to be only those points at the very top, or that would otherwise provide the most visibility. Additional optimizations can be achieved by limiting the area in which the visibility point can be selected. For example, most people are between 4 and 6 feet tall, and the visibility point can be selected at a common height within this range. Alternatively, the portable computing device 20 can provide for a user input specifying the user's height, and always select visibility points at that height. Visibility points can also be selected so as not to coincide with areas where an object already exists, and would prevent the user from standing there. By eliminating such options, the range of visibility points and points on the building narrows, resulting in a more efficient visibility region calculation.

In another preferred embodiment, step 406 can be performed in part by the portable computing device 20, and in part by the server computing device 49. The server computing device 49 can calculate, either in advance, or as needed, the visibility regions for common landmarks that may be often described by a user. The portable computing device 20 can, therefore, rely on the greater processing power of the server computing device 49 and simply request the visibility region for any common landmarks necessary to determine the location of the user. By only computing the visibility regions for common landmarks, the server computing device 49 can minimize the amount of time spent on specialized requests, and can more efficiently serve a greater number of portable computing devices. As an alternative, however, the server computing device can calculate visibility regions on request, such that the portable computing device can send a list of candidate landmarks and the server computing device can return their visibility areas, or even the intersection of their visibility areas. Because of the increased processing power of the server computing device 49, the location of the user can be determined more efficiently if the portable computing device 20 relies, at least in part, on calculations performed by the server computing device.

At step 408, the portable computing device 20 can calculate the intersection of the visibility regions determined at step 406. The intersection of a visibility region is the location where both landmarks, whose visibility regions are being intersected, are visible. Thus, the intersection of visibility regions is the area covered by both visibility regions. As more visibility regions are intersected with one another, the area of their intersection generally tends to decrease. By definition, the user must be located at a position where all of the landmarks the user described are visible. Thus, the intersection of the visibility regions of all of the landmarks described by the user will identify the user's location, or a small area containing the user's location.

Step 408 also aids in trimming the candidate landmarks and identifying the landmark described by the user. Many of the candidate landmarks determined at step 404 may have no intersecting visibility regions, and can, therefore, be eliminated. For example, returning to FIG. 2, the user 200 may describe a red building 206, a brown warehouse 204, and a white water tower 208. There may be a number of red buildings, brown warehouses, and white water towers in the databases available to the portable computing device 20. However, it is likely that very few of them will have a visibility region that intersects with other visibility regions to provide an area, or a point, from which one could see all three at the same time. Those candidate red buildings, brown warehouses, and white water towers whose visibility regions do not intersect can be discarded as candidates. Additional candidates can be discarded based on the relative location of the landmarks provided by the user. For example, if the user specifies that one landmark is in front of the user, and another is behind the user, the area in which the user can be located can be narrowed. Some candidate landmarks, then, may not be visible from this narrowed area, and can be discarded. When sufficient candidates have been discarded, the intersection of the resulting candidates' visibility regions defines the area in which the user is currently located. Additionally, the relative location input form the user can be used to further narrow the area in which the user is currently located. Depending on the settings at step 410, to be described further below, the portable computing device may have completed its task of locating the user, or it may need additional input to do so to a sufficient level of accuracy.

Candidate landmarks whose visibility regions do not coincide with the visibility regions of other candidate landmarks described by the user can be discarded even if the discarded candidate landmark was the only candidate landmark for a description provided by the user. By discarding candidate landmarks, even if the result is the exclusion of a component of the user's input, the system can maintain robustness in the face of an inaccurate description by the user, an inaccurate entry in one of the databases, or an improper candidate landmark determination at step 404. For example, if the user inadvertently described water tower 208 of FIG. 2 as a yellow water tower, the step 404 may find a candidate yellow water tower located far from the other landmarks the user described, including building 206 and warehouse 204. Additional input from the user regarding the specific landmarks described may not be able to solve the fundamental problem that the only yellow water tower in the databases is nowhere near the other landmarks described by the user, and thus there is no location at which a yellow water tower is visible together with building 206 and warehouse 204. In such a situation, the location of the user 200 can be accurately determined by discarding the user's input of a yellow water tower. A similar scenario can result if the databases contain an incorrect location for the water tower 210.

While the embodiment of FIG. 4 shows steps 406 and 408 as independent and occurring in a particular temporal order, another embodiment can combine steps 406 and 408 in such a manner that step 406 need not be completed prior to commencing step 408. Such an arrangement can result in efficiencies because visibility regions are computationally expensive to calculate. Thus, step 406 can initially determine the visibility regions of the landmark candidates from the user descriptions that resulted in the fewest candidate landmarks. Those visibility regions can then be intersected to yield a smaller region at step 408. By first determining the visibility regions of those landmarks described by the user that resulted in the fewest candidate landmarks, the portable computing device 20 can take advantage of the decreasing visibility intersection area by determining whether other candidate landmarks are visible from the intersection area, instead of calculating their entire visibility area and intersecting it. Such a technique is analogous to query optimization in database systems. For example, returning to the example from FIG. 2 above, if the user described the red building 206, the brown warehouse 204, and the white water tower 208, step 406 may determine the visibility region of the white water tower first because there may only be two such water towers in the databases. After the visibility regions of the two white water towers were determined, they could be intersected with the visibility regions of the brown warehouses contained in the databases, of which there may be only five. The only intersection in these visibility regions will likely be the intersection of the visibility region of water tower 208 and warehouse 204. As a result, the portable computing device 20 does not need to determine the visibility regions of all of the red buildings in the databases, of which there could be quite a few. Instead, it is sufficient to determine the visibility of the candidate red buildings only from the area defined by the intersection of the visibility region of water tower 208 and warehouse 204. Whichever building can be seen from that area is likely the building identified by the user. Then its whole visibility region can be determined and intersected with intersection of the visibility region of water tower 208 and warehouse 204, yielding an even smaller area, and a more precise determination of the user's location. By avoiding the calculation of the visibility areas and intersections of those landmarks described by the user that resulted in the most candidate landmarks, the portable computing device can achieve a greater efficiency in determining the location of the user.

Another preferred embodiment uses a hierarchical approach to steps 406 and 408 shown in FIG. 4. To determine the visibility region of a candidate landmark at step 406, the area covered by the database can be divided into segments, and each segment can be tested to determine whether the candidate landmark may be visible from that segment. The candidate landmark may be visible from a segment if there is at least one point in that segment from which the candidate landmark is visible. Those segments from which the candidate landmark is not visible do not need to be considered in further visibility calculations. At step 408, the segments from which a first candidate landmark is visible can be intersected with the segments from which a second candidate landmark is visible by simply finding the segments from which they are both visible. By operating at a segment level, as opposed to an individual point level, the hierarchical approach allows greater efficiencies in the initial calculations. Once a sufficient number of candidate landmarks' visibility regions are intersected, there can be few resulting segments from which all of these candidate landmarks are visible. Then, returning to step 406, the visibility region can be determined for each candidate landmark testing every point in the segment, but only for the segments from which all of the candidate landmarks were determined to be visible. These more accurate visibility regions can then be intersected at step 408 to determine the user's location. By reducing the size of the area for which the more accurate visibility region can be calculated and intersected, the hierarchical approach can result in greater efficiencies.

Ultimately, the visibility calculations of the candidate landmarks at step 406 and their resulting intersection at step 408 are likely to result in a small area, or possibly a unique point, from which all of the landmarks described by the user are visible. By definition, then, this is the user's location, and the portable computing device 20 can inform the user of their location at step 412. Prior to informing the user, the portable computing device can determine its level of confidence regarding the derived location of the user at step 410 exceeds a threshold confidence level. The threshold confidence level can be dependent on a predetermined threshold confidence area can be provided to the portable computing device 20. For example, if the threshold confidence area is a city block, or a few feet in an indoor environment, and the derived location of the user is accurate to within a city block or less, or accurate to within a few feet or less in an indoor environment, the user can be presented with the derived location. However, if the portable computing device 20 ultimately determines that the landmarks described by the user are all visible from an area larger than the threshold confidence area, such as an area encompassing many city blocks, the computing device can perform additional steps prior to providing the determined location to the user. Alternatively, the threshold confidence level can be dependent on a user defined threshold confidence area that can be set by a user. Thus, if the user only requires an approximate location, a more lenient threshold area can be used by the portable computing device 20 and, as a result, the user will be able to obtain their location more efficiently, as the computing device will sooner determine a visibility region within the more lenient threshold. Conversely, a user who sets a more stringent threshold may find that the portable computing device requires more information before it can provide a determined location that meets the threshold confidence level.

In another preferred embodiment, the determination of the visibility regions and their intersections at steps 406 and 408 can take into account a decreasing probability of visibility as the distance from the selected visibility point to the landmark increases. Because of the simplification process described above, wherein the three-dimensional topographical database models its environment as comprised of simple polygonal walls, and because many image recognition techniques do not extrapolate details such as trees, leaves, telephone lines, and the like, the present invention can take such additional visibility-impacting elements into account by reducing the percentage chance that the landmark is visible from the visibility point as the distance between the visibility point and the landmark increases. Thus, even though the visibility calculations indicate that there is no obstruction between the selected visibility point and the landmark, the portable computing device can take into account various other factors affecting visibility and decrease the percentage chance that the landmark is, in fact, visible from the selected visibility point, as the visibility point is moved further away. For example, even though visibility calculations at step 406 may indicate that the landmark is visible from a selected visibility point half a mile away, the portable computing device can use a visibility probability of only 50% for that visibility point. Such a model can more closely approximate reality as there is a less than 100% certainty that a user can see a particular landmark half a mile away in a crowded city, even if there is no wall in the user's line of sight, because other obstructions, not currently modeled in the three-dimensional topographical model, may interfere with the user's visibility. As will be understood by those skilled in the art, the percentage visibility can decrease as the distance from the landmark increases in a manner proportional to the inverse of the square of the distance from the landmark. As will also be understood by those skilled in the art, the intersection of the visibility regions at step 408 can be determined by multiplying the visibility percentages of the individual visibility regions being intersected.

If steps 406 and 408 determine the visibility probability, the confidence, as determined at step 410, can also take into account the visibility probability, in addition to the size of the area containing the user's location. The area containing the user's location can be determined by the intersections performed by step 408 as described in detail above, and can be expressed as an area with decreasing probabilities of visibility of all of the landmarks described by the user as the distance from a central area increases. Such visibility probabilities can also indicate the probability that the user is in the determined area. Thus, there may exist a central area, or a single point, at which all of the landmarks described by the user are visible and their visibility is 100%. Further from this area, the landmarks may still all be visible, but the visibility probability decreases. One method for taking into account the visibility probability when determining the confidence of the user's location can be by comparing the area determined to contain the user's location at a given visibility probability to the threshold confidence area. As described in detail above, the confidence area can be pre-determined, or it can be selected by the user based on the user's needs. Similarly, a threshold probability can also be pre-determined or it can be selected by the user based on the user's needs. Once the threshold probability is determined, the area determined by step 408 at the threshold probability can then be compared to the threshold confidence area at step 410 to determine whether there is sufficient confidence in the result of the computations through step 408. For example, if the threshold probability is selected to be 50%, and the threshold confidence area is selected be one city block, then the user's location is confidently determined when the area determined by step 408 is such that all of the landmarks described by the user are visible, with a 50% probability, or higher, from an area one city block, or smaller. By including the visibility probability in the calculations, the user can adjust the precision of the location determination using two variables: the visibility probability and the confidence area.

As shown in step 414, if, at step 410, it is determined that a threshold confidence level has not been reached, the portable computing device 20 can ask that the user provide additional input. The user can provide additional input regarding the landmarks the user has already described, which can reduce the number of candidate landmarks, or the user can describe a new landmark, which can provide another visibility area that can decrease the area from which all of the landmarks described by the user are visible. Alternatively, as shown in step 416, the portable computing device 20 can request specific information from the user. Thus, if a landmark description by the user creates a large list of candidate landmarks at step 404, but only a few, or only one, of the candidate landmarks contain a unique feature, the portable computing device can determine the unique feature and ask the user whether the landmark the user is describing contains this feature. Such a question-and-answer feedback cycle can continue until the list of candidate landmarks for each of the landmarks described by the user has been reduced sufficiently such that the results of step 408 have a sufficient confidence level at step 410. The portable computing device 20 can also ask specific questions of the user when determining the area where each of the landmarks described by the user can be seen. For example, returning to FIG. 2, if the computing device 20 has calculated two areas from which a user could see the warehouse 204, the building 206, and the water tower 208, but only one of those areas also provides visibility to the radio tower 210, the portable computing device can ask the user whether the user sees a radio tower. User 200, shown in FIG. 2, may respond in the negative, since the user's view of the radio tower is likely obstructed by the skyscraper 202. By providing that answer, the user can allow the portable computing device to more accurately determine the user's position, and have sufficient confidence at step 410.

While FIG. 4 illustrates steps 416 and 414 as the result of the confidence analysis at step 410, another preferred embodiment can perform step 414, step 416, or both after either step 404 or step 406. For example, step 416 can be used to narrow the list of candidate landmarks determined at step 404 prior to any visibility calculations at step 406, resulting in an increased efficiency due to the avoidance of the computationally expensive visibility calculations. Similarly, step 414 can be used to identify a particular visibility region if step 408 results in two or more non-contiguous visibility regions. The present invention contemplates feedback to the user, in the form of questions, whenever appropriate to create efficiencies or provide a more accurate location to the user.

Finally, as shown in step 412, once an appropriate level of confidence is reached, the user can be informed of their location. As can be seen, the present invention provides mechanisms by which a user's location can be determined through a description of the user's surroundings. The present invention does not require a significant infrastructure, nor does it impact the user's privacy. Instead the present invention relies on the same elements that users have relied on for many years to provide location and direction information: common landmarks and other visual cues.

Though the above description has generally referred to the portable computing device 20 as performing certain actions, it is not limited to implementation only on a portable computing device. One alternative contemplated by the present invention is that the portable computing device 20 can act as a thin client and simply receive user input and pass the user input on to a server computing device 49. The server computing device 49 can then perform the above functions described as performed by the portable computing device. For example, the server computing device 49 can utilize its increased processing resources to more efficiently determine candidate landmarks based on the user's input, calculate visibility regions for those landmarks, and determine an intersection of those landmarks to derive the location of the user, in the manner described in detail above. Once the location of the user is derived, or if the server computing device 49 requires additional input, it can contact the portable computing device 20 to request the additional input from the user, or to provide the derived location to the user.

Another alternative contemplated by the present invention is the use of infrastructure communication between portable computing devices can be used, in addition to user input, to determine a user's location. Thus, one portable computing device can listen for, or seek out, other portable computing devices in its immediate vicinity. If such other portable computing device are in the vicinity, the portable computing devices can poll each other to determine the most recent derivation of a user's location and, assuming the derivation was sufficiently recently, can use the user's location as derived by another portable computing machine, either as another input, or as the final result presented to the user.

Yet another alternative contemplated by the present invention is that the portable computing device can act in conjunction with, or as a back-up to, other known locating mechanisms, such as GPS or E-911. For example, the present invention can be used by a GPS receiver to provide the user's location in a downtown area where satellite reception is difficult and unreliable. Alternatively, the GPS receiver could use the present invention to verify the location it derives based on the satellite signals. The present invention also contemplates the converse: the known locating mechanisms can act in conjunction with, or as a back-up to, the present invention. Thus, a GPS receiver can be installed onto portable computing device 20 to verify the derived location of the user. For example, the known locating mechanisms can provide additional input with which to determine the confidence of the derived user location at step 410.

In view of the many possible embodiments to which the principles of this invention may be applied, it should be recognized that the embodiment described herein with respect to the Figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

All of the references cited herein, including patents, patent applications, and publications, are hereby incorporated in their entireties by reference.

I claim:

1. A database of landmarks comprising, for each landmark in the database: topological information related to the landmark, wherein the topological information describes a larger and more geometrically simple structure than the landmark; and user-noticeable features related to the landmark, wherein the user-noticeable features are prominent features or features that distinguish the landmark from similar landmarks in the database, and wherein further the user noticeable features are added to the database via manual annotation.

2. The database of claim 1, wherein the topological information is automatically derived from a series of overlapping images.

3. The database of claim 2, wherein the topological information is automatically derived from the series of overlapping images using edge histogramming.

4. A method for generating a database of landmarks comprising:

deriving topological information from a series of overlapping images;

quantizing the topological information to represent a simple geometric structure;

increasing the size of the simple geometric structure to account for quantizing errors;

generating descriptions of user-noticeable features of the landmarks; and linking the descriptions of the user-noticeable features to a corresponding quantized topological information.

5. The method of claim 4, wherein the simple geometric structure is only four polygons.

6. The method of claim 5, wherein the deriving the topological information from the series of overlapping images uses edge historgramming.

7. The method of claim 5, wherein the user-noticeable features are prominent features or features that distinguish a landmark from similar landmarks in the database.

8. The method of claim 5, wherein the user-noticeable features are manually selected.

9. The method of claim 5, wherein the generating descriptions of the user-noticeable features of the landmarks uses common linguistic terms used to describe the user-noticeable features.

10. The method of claim 5 further comprising removing each landmark from the database that is not either: (1) likely to be identified by a user, or (2) is large enough to cause occlusion of at least one other landmark in the database.

11. A computer-readable medium having computer-executable instructions for generating a database of landmarks, the computer-executable instructions performing steps comprising:

deriving topological information from a series of overlapping images;

quantizing the topological information to represent a simple geometric structure;

increasing the size of the simple geometric structure to account for quantizing errors;

generating descriptions of user-noticeable features of the landmarks; and linking the descriptions of the user-noticeable features to a corresponding quantized topological information.

12. The computer-readable medium of claim 11, wherein the simple geometric structure is only four polygons.

13. The computer-readable medium of claim 11, wherein the computer-executable instructions for deriving the topological information from the series of overlapping images implement edge historgramming.

14. The computer-readable medium of claim 11, wherein the user-noticeable features are prominent features or features that distinguish a landmark from similar landmarks in the database.

15. The computer-readable medium of claim 11, wherein the user-noticeable features are manually selected.

16. The computer-readable medium of claim 11, wherein the computer-executable instructions for generating descriptions of the user-noticeable features of the landmarks utlize common linguistic terms used to describe the user-noticeable features.

17. The computer-readable medium of claim 11, further comprising removing each landmark from the database that is not either: (1) likely to be identified by a user, or (2) is large enough to cause occlusion of at least one other landmark in the database.

* * * * *